Feb. 4, 1964 B. RONAY 3,120,138
PRESSURE WELDING DEVICE
Filed March 10, 1961 2 Sheets-Sheet 1
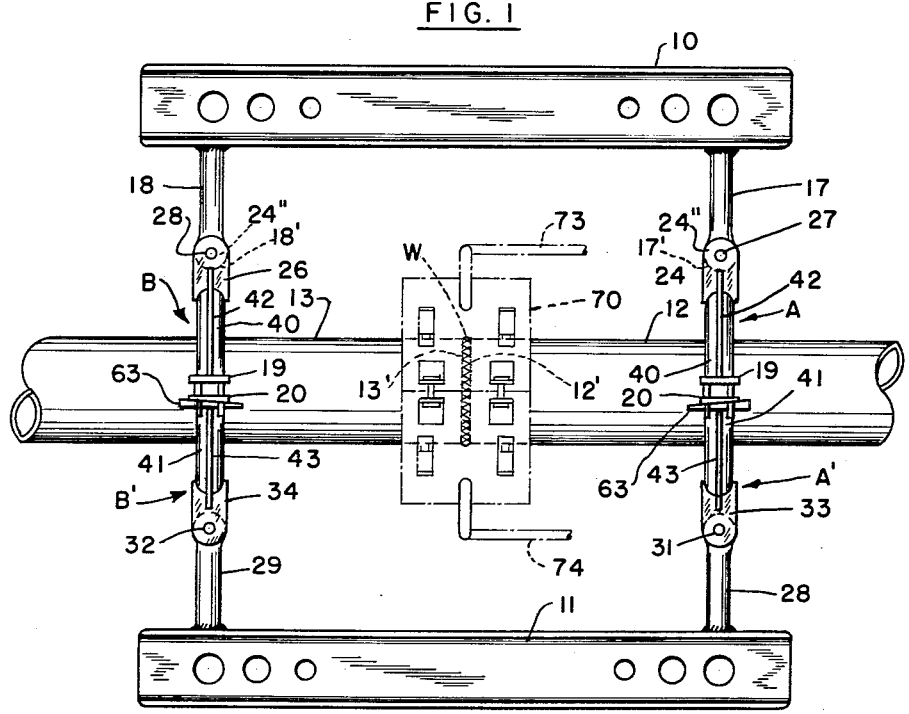
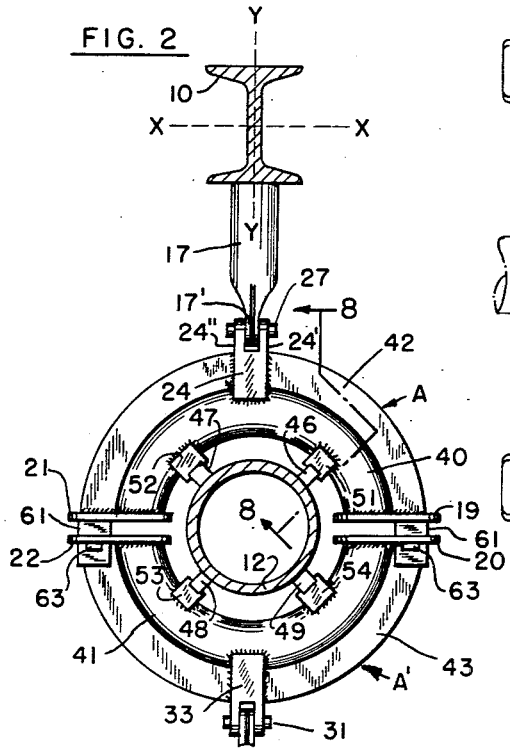
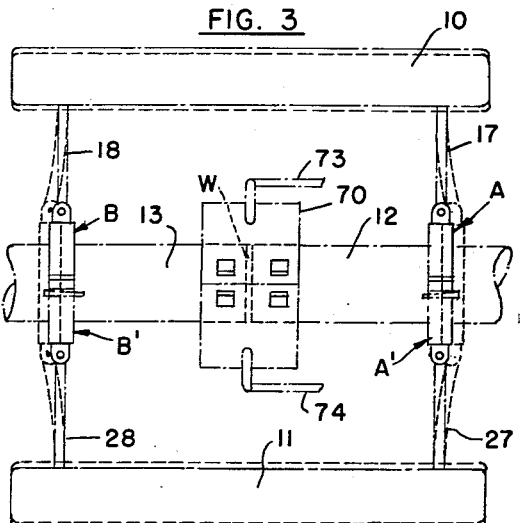
INVENTOR
BELA RONAY
BY
ATTORNEY Feb. 4, 1964     B. RONAY     3,120,138
PRESSURE WELDING DEVICE
Filed March 10, 1961     2 Sheets-Sheet 2
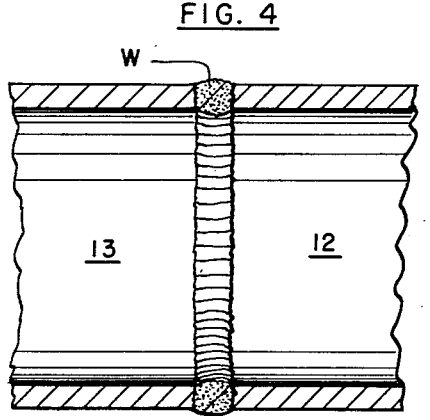
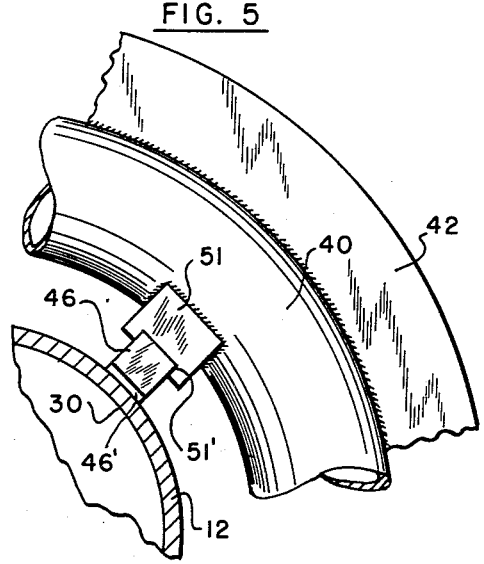
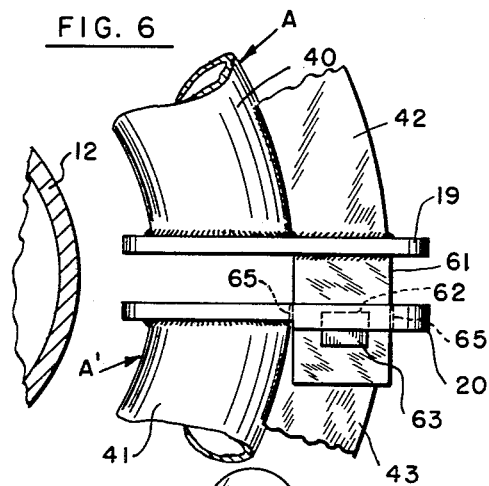
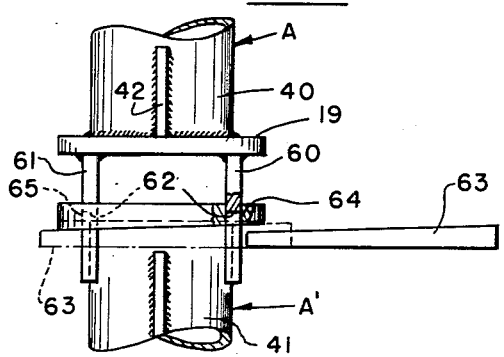
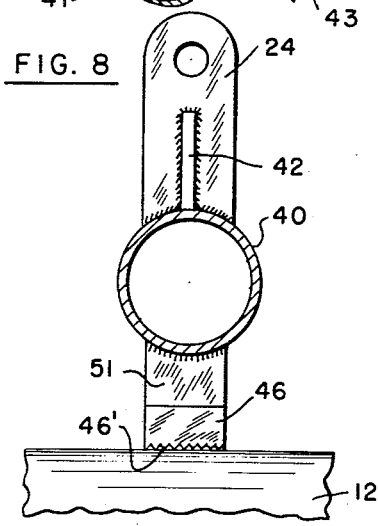
INVENTOR
BELA RONAY

United States Patent Office 3,120,138
Patented Feb. 4, 1964

3,120,138
PRESSURE WELDING DEVICE
Bela Ronay, 154 Conduit St., Annapolis, Md.
Filed Mar. 10, 1961, Ser. No. 94,895
4 Claims. (Cl. 78—82)

The present invention relates to butt welding of work pieces, such as, tubings, pipes, rails, bars etc. and in particular for an improved combination holding frame and means for upsetting the weld joint at the time of the actual welding period.

Butt welding is not new in the art, many methods and devices have been developed and patented for this purpose, particularly in the art of torch and electric welders. Most of this equipment is intended for stationary use and is heavy, expensive and difficult to handle, while the present device is intended as an improvement on these features, and in addition, to being light enough to be carried into the field, and to further improve the weld joint itself.

One of the objects of the invention is to provide such a device that will be simple in construction, efficient and easy to operate.

Another object of the invention is to provide such a device that will carry means for a calculated movement of the work pieces for upsetting of the weld joint.

Another object of the invention is to provide a device that will keep the work pieces aligned during the welding and cooling period.

While several objects of the invention have been pointed out, other objects, uses and advantages will become more apparent as the nature of the invention is more fully disclosed, which consists of its novel construction, combination and arrangement of its several parts as illustrated in the accompanying drawings and is particularly pointed out in the detailed descriptions to follow.

In the drawings:

FIGURE 1 is a side view in elevation of the device.
FIGURE 2 is an end view in elevation of the device.
FIGURE 3 is a schematic view in side elevation.
FIGURE 4 is an enlarged fragmentary sectional view of a butt weld joint.
FIGURE 5 is an enlarged fragmentary view in elevation of part of the ring clamp.
FIGURE 6 is an enlarged fragmentary side view of the ends of the clamp.
FIGURE 7 is an enlarged fragmentary top plan view of the ends of the clamp similarly to that shown in FIGURE 6.
FIGURE 8 is an enlarged sectional view taken along 8—8 of FIGURE 2.

The device is shown in use with an improved carbonaceous fuel heater, which is fully disclosed in a separate patent application, however the device may be used with other heating devices suitable to develop localized heating to welding temperature.

In referring to the device as set forth, like reference characters are used to designate like and similar parts throughout the several views.

The device comprises a frame made up preferably of two supports 10 and 11 positioned diametrically opposite each other on each side of work pieces 12 and 13, which are being welded together. Positioned about the work pieces are a pair of detachable clamps which are preferably constructed into semi-circle sections, A, B, A' and B' one section of each clamp being connected with the frame member 10 and the other sections being connected with the frame member 11, however the clamp may be constructed in smaller sections, or parts to facilitate its portability. Fixedly secured to the member 10 are deflection elements 17 and 18. These members normally have one of their ends welded in place on the frame members and their other ends extending outwardly from the frame member in the direction of the clamp. Referring to the top section of the device in FIGURE 1, which includes the frame member 10, the deflection means 17 and 18 and sections A and B of the clamp, the clamp sections A and B are provided on their circumference with brackets 24 and 26 having a bifurcated outer end, as shown best at 24' and 24" in FIGURE 2. The outer end of the deflection members 17 and 18 are each provided with a tongue portion 17' and 18' as shown in FIGURES 1 and 2. The tongue portions are hinged between the bifurcated members 24' and 24" of the clamps sections A and B by the pins 27 and 28. Therefore, it will be seen that the deflectors have one of their ends rigidly secured to the outer frame member and their outer ends hingedly connected with the clamping sections. The deflection members are made of any desirable material, or in any desired cross-sectional shape or length, they are presently shown as being of tubular form. The necessary amount of energy stored in these deflector members depends upon a number of conditions, one being, the thermal expansion of the work pieces, which reaches its maximum at a temperature level just below that of the welding range, another factor is the distance between the clamp, which determines the average temperature, reaching the total expansion of the length of the work piece engaged between the clamps. Different materials have different welding temperatures, and coefficients of expansion, therefore the device must be designed to take care of these differences in these materials and conditions under which it is used. Another element in the storing of this energy is, the length of the movement of the work pieces, which may be calculated by the position of the clamps from the abutted ends, that is, the further from the abutted ends the clamps are, the more the movement will be, and the nearer they are to the abutted ends the less movement will be. Of course, this has its limitations.

While much of the prior description has been centered around the upper portion of FIGURE 1 including the frame member 10, the deflectors 17 and 18 and the clamp sections A and B, the lower portion of the device contains substantially the same construction and arrangement. That is, member 11 is provided with two identical deflectors 28 and 29, which are hingedly connected by pins 31 and 32 with the bracket members 33 and 34 carried on the clamp sections A' and B' and operate in exactly the same manner as the deflecting members 17 and 18.

Referring to the clamps as a whole, both clamps are of the same general construction, therefore a detailed description of one complete clamp should be sufficient for the general description of both clamps, likewise the corresponding clamp halves or sections are also or like construction. Taking for example, a complete clamp is made up of sections A and A' the outer body portion is preferably made in two halves or sections. Each clamp half or section comprises an arcuate tubular portion 40 and 41 having an arcuated flat fin portion 42 and 43 welded thereto on its outer semi-circular surface with its flat surfaces in a plane perpendicular to the axes of the clamp. This rib greatly increases the general strength of the clamp and in addition offers substantial rigidity to the clamping mechanism and the bracket members 24 and 33 hingedly connecting the deflection members with the clamp. On the inside surface of these arcuated tubular clamp section members, are work gripping members for gripping the work pieces, which in this illustration, is a circular pipe.

These work gripping members 46, 47, 48 and 49 may be seen in FIGURE 2 in contact with the work piece 12. Each of these members are held in position by blocks 51, 52, 53 and 54. These blocks, as shown in FIGURE 5, are of concaved form to fit the inner surfaces of the tubular member and are welded thereto. The members 46 to 49 are carried within a groove as illustrated at 51' of the member 51 as shown in FIGURE 5. The members 46 to 49 are also preferably provided with serrations 46' to aid in gripping the pipe. This same structure is used in all the pipe gripping elements which are evenly distributed between the clamp sections, the present structure showing two pipe gripping elements for each clamp section. However, other gripping methods are applicable also for large work pieces, where frictional clamping may not be sufficient, the contact plate may be temporarily welded to the work piece to provide the desired shear resistance.

When the device is to be used these halves are tightly clamped about a work piece, as shown in FIGURE 2 and are adapted to be tightened on the work by drivable tapered wedges, such as, the Morse tapered wedge. Each section of the clamp extends approximately half way around the work pieces and is provided with means for drawing the clamp sections taut thereabout, which is shown as a circular pipe. The ends of the clamps sections are faced off and face plates 19, 20, 21 and 22 are welded to the end of the tube members 40 and 41 including the ends of their respective fins 42 and 43. A detail illustration of the ends and face plates of the clamp sections are shown in FIGURES 6 and 7. And here again, this same structure is used in holding the other clamp sections about the work piece, therefor only one detail description is presented. For each clamp as shown in FIGURES 6 and 7 a face plate 19 is welded across one end of the arcuated tube 40 and fin 42. Extended outwardly from the plate 19 and fin and parallel with the fin member 42 there are two plate members 60 and 61. These plate members are provided with elongated slots, as shown at 62 in FIGURE 7 for receiving a tapered wedge 63. The opposite corresponding end of the tubular member 41 and the fin 43 has welded to its face, a face plate 20. This face plate 20 is provided with elongated openings 64 and 65 for admitting the members 60 and 61 to be slidably received therein. When the sections are put together about the work piece they are of such design and of such size as to encircle the work piece clamping the same within the work gripping elements 46 to 49 and allowing the members 60 and 61 to extend through the face plate 20 back of which the tapered pin 63 is insereted within the openings 62 and driven through the slots to draw the clamp sections together to set the clamp on the work piece. The structure of clamp section B and B' are the same as first described for clamp sections A and A'.

Referring again to the frame members 10 and 11 to which the deflecting members 17, 18, 28 and 29 are fixed, these frame members are designed to have very little deflection along their X axis and of such rigidity above their Y axis as to prevent the joint from buckling when the weld zone is upset.

In operation the work pieces 12 and 13 are placed in abutted relationship as shown in FIGURES 1 and 3. The assembly of the frame member 10 and the half clamp sections A and B are placed in position, the half clamp section A is placed about the work piece 12 and the half clamp section B placed over the work piece 13. The clamps are tightened upon the work pieces by the wedge 63, as previously described and illustrated best in FIGURES 6 and 7, after which the heater 70 is placed over the abutted ends 12' and 13' of the work pieces. The furnace is lighted and air, or air and oxygen is furnished through the pipes 73 and 74 to support the combustion of the fuel element for heating the abutted ends and the area adjacent the abutted ends of the work pieces. As the welding heat is applied, each work piece begins to expand longitudinally outwardly from its abutted end, which sets up a bending action in the cantilevers 17, 18, 28 and 29. This expansion naturally applies pressure between the abutted ends. When the work piece has reached a forgable, or malleable state the energy stored in the cantilever arms reacts to move the work pieces together for the same distance as the clamp members have been moved outwardly by the longitudinal expansion of the work pieces which upsets the abutted end at the welded joint W to create a tight and effective welding of the abutted ends. On completion of the holding period, the device may be removed and transported to another section of the work to be welded.

This device being clamped on the work piece and having its frame members 10 and 11 positioned on opposite sides of the work pieces keep the abutted ends in alignment during the welding operation.

It is readily seen that a device of this character has a minimum of moving parts and is automatic in its operation to upset the welding joint and at the proper time.

While the invention has been described in detail for a particular structure, it is not intended as a limitation and the scope of the invention is best set forth in the appended claims.

I claim:

1. A holding frame and clamp for pressure welding by heat the abutted ends of separate elongated sections of work pieces comprising, a frame extending longitudinal and outwardly from the elongated sections and spanning the abutted ends thereof, a clamp engaging each of the separate sections at predetermined distances from their abutted ends, deflectable cantilever arms having one of their ends connected to each clamp and their opposite ends secured to the frame for storing energy for moving the work pieces during the welding period, the cantilever arms being deflectable longitudinally by the longitudinal expansion of the work pieces by the welding heat applied to the abutted ends of the sections of work pieces; whereby, energy of sufficient force is stored in the movement of the cantilever arms by the expansion of the work pieces to move the abutted ends toward each other for a distance equal to the distance traversed by the deflected cantilever when the abutted ends reach a weldable state under the welding heat for upsetting the weld of the abutted ends.

2. A frame and clamp for pressure welding by heating the abutted ends of separate elongated sections of work pieces comprising, a frame extending longitudinally and outwardly from the elongated sections and spanning the abutted ends thereof, a clamp engaging each of the separate sections at predetermined distances from their abutted ends, at least two deflectable cantilever arms having one of their ends hingedly connected to each clamp and diametrically opposite each other and their opposite ends being rigidly secured to the frame for storing energy for moving the work pieces during the welding period, the cantilever arms being deflected longitudinally by the longitudinal expansion of the work pieces by the welding heat applied to the abutted ends of the sections of work pieces; whereby, energy of sufficient force is stored in the movement of the cantilevers by the expansion of the work pieces to move the abutted ends toward each other for a distance equal to the distance traversed by the deflected cantilevers when the abutted ends reach a weldable state under the welding heat for upsetting the weld area of the abutted ends.

3. A device for use in heat welding the abutted ends of separate elongated sections of work pieces comprising, a support extending longitudinally and outwardly of the sections being welded and spanning the abutted ends thereof, a clamp engaging each of the separate elongated work pieces at predetermined distances from their abutted ends, a plurality of elastic energy storing deflectable means having one end of each hingedly connected to the clamping elements and the other end fixedly connected to the elongated support for allowing for longitudinal movement of the work pieces during the welding period, the deflecting means being deflectable longitudinally by the longitudinal expansion of the work pieces by the welding heat applied thereto; thereby, storing energy in the movement of the deflectable means of sufficient force to move the abutted ends toward each other for a distance equal to the distance traversed by the deflectable means by the expansion of the work pieces when the abutted ends reach a weldable state under the welding heat for upsetting the area of the weld of the abutted ends.

4. A device for use in heat welding the abutted ends of separate elongated work pieces comprising, a frame made up in at least two parts extending longitudinally and outwardly and on opposite sides of the work pieces being welded and spanning the abutted ends thereof, a separate clamp engaging each of the separate work pieces at a predetermined distance from their abutted ends, a plurality of energy storing deflectable supports each having one end connected to the outer periphery of each of the clamps and the other end fixedly secured to the frame, each of the clamps being formed in at least two semi-circular sections, each of the corresponding semi-circular clamp sections being connected to one of the frame parts and the other corresponding semi-circular clamp sections being connected to the other frame part and means at each end of the semi-circular clamp sections for securing them to their companion section to form a complete ring clamp about the work pieces.

References Cited in the file of this patent
UNITED STATES PATENTS

| | | |
|---|---|---|
| 1,167,043 | Brewitt | Jan. 4, 1916 |
| 1,246,909 | Goldschmidt | Nov. 20, 1917 |
| 1,561,224 | Fritsche | Nov. 10, 1925 |
| 1,775,311 | Halle | Sept. 9, 1930 |
| 2,012,443 | Coe | Aug. 27, 1935 |
| 2,054,375 | Halle | Sept. 15, 1936 |
| 2,061,287 | Muehl | Nov. 17, 1936 |
| 2,231,027 | Renner | Feb. 11, 1941 |
| 2,344,939 | Bennett | Mar. 28, 1944 |
| 2,421,070 | Kerns | May 27, 1947 |
| 2,730,599 | Ronay | Jan. 10, 1956 |
| 2,944,449 | Wheeler et al. | July 12, 1960 |
| 3,065,536 | Chapman | Nov. 27, 1962 |